United States Patent
Inoue (10) Patent No.: US 11,110,886 B2
(45) Date of Patent: Sep. 7, 2021

(54) VEHICULAR PASSENGER RESTRAINT DEVICE

(71) Applicant: MAZDA MOTOR CORPORATION, Hiroshima (JP)

(72) Inventor: Junsuke Inoue, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/958,424

(22) PCT Filed: Dec. 17, 2018

(86) PCT No.: PCT/JP2018/046349
§ 371 (c)(1),
(2) Date: Jun. 26, 2020

(87) PCT Pub. No.: WO2019/131280
PCT Pub. Date: Jul. 4, 2019

(65) Prior Publication Data
US 2021/0061219 A1 Mar. 4, 2021

(30) Foreign Application Priority Data

Dec. 28, 2017 (JP) .............................. JP2017-254303

(51) Int. Cl.
*B60R 22/18* (2006.01)
*B60R 22/26* (2006.01)
(Continued)

(52) U.S. Cl.
CPC .............. *B60R 22/18* (2013.01); *B60R 22/26* (2013.01); *B60N 2/20* (2013.01); *B60N 2/919* (2018.02); *B60R 2022/1818* (2013.01)

(58) Field of Classification Search
CPC . B60R 22/18; B60R 22/26; B60R 2022/1818; B60R 2022/266; B60N 2/20; B60N 2/688
See application file for complete search history.

(56) References Cited

U.S. PATENT DOCUMENTS

2012/0001466 A1* 1/2012 Varcus ................... B60R 22/26
297/331
2015/0336536 A1 11/2015 Stein
(Continued)

FOREIGN PATENT DOCUMENTS

FR 2916392 A1 11/2008
JP H09207711 A 8/1997
(Continued)

OTHER PUBLICATIONS

International Search Report issued in PCT/JP2018/046349; dated Mar. 5, 2019.

*Primary Examiner* — Ruth Ilan
*Assistant Examiner* — Mary E Young
(74) *Attorney, Agent, or Firm* — Studebaker & Brackett PC (57) ABSTRACT

A vehicular passenger restraint device including a seatbelt capable of restraining a passenger seated in a rear seat 10 includes a belt guide 50 disposed on the outer side, in the vehicle width direction, of an upper portion of a seat back 12, and the belt guide 50 is configured such that an inner longitudinal surface portion 52 is tiltable toward the inner side in the vehicle width direction by a load applied from the seatbelt at the time of collision. A lock release switch 14 for the seat back 12 is disposed on the inner side in the vehicle width direction relative to the belt guide 50. A regulation member 55 regulating the inner longitudinal surface portion 52 between the belt guide 50 and the lock release switch 14, not to be incline toward the inner side in the vehicle width direction by a predetermined angle or more.

6 Claims, 6 Drawing Sheets

(51) Int. Cl.
*B60N 2/90* (2018.01)
*B60N 2/20* (2006.01)

(56) References Cited

U.S. PATENT DOCUMENTS

| | | | |
|---|---|---|---|
| 2017/0120860 A1* | 5/2017 | Shenaq | B60R 22/26 |
| 2019/0161055 A1* | 5/2019 | Abramoski | B60N 2/688 |

FOREIGN PATENT DOCUMENTS

| | | | | |
|---|---|---|---|---|
| JP | 2009090963 A | * | 4/2009 | B60N 2/688 |
| JP | 2011178288 A | | 9/2011 | |
| JP | 2012116208 A | | 6/2012 | |
| JP | 2014189162 A | | 10/2014 | |
| JP | 2016088335 A | | 5/2016 | |
| JP | 2018135065 A | | 8/2018 | |
| JP | 2019014457 A | | 1/2019 | |
| KR | 20210058276 A | * | 5/2021 | B60R 22/28 |

* cited by examiner

OUTSIDE OF VEHICLE ← → INSIDE OF VEHICLE

FIG.5B

OUTSIDE OF VEHICLE ← → INSIDE OF VEHICLE

FIG.6

VEHICULAR PASSENGER RESTRAINT DEVICE

TECHNICAL FIELD

The technology disclosed herein relates to a vehicular passenger restraint device including a seatbelt capable of restraining a passenger seated in a rear seat.

BACKGROUND ART

A vehicle such as an automobile having a rear seat includes a passenger restraint device that protects a passenger seated in the rear seat by restraining the passenger at the time of collision. The passenger restraint device usually includes a three-point seatbelt device that restrains the torso and pelvis of the passenger seated in the rear seat.

In the three-point seatbelt, the seatbelt is drawn from a retractor disposed on the outer side in a vehicle width direction on the rear side of a vehicle body relative to the rear seat. The seatbelt drawn is then fixed to a belt anchor disposed on the outer side in the vehicle width direction in a seat cushion of the rear seat. At the same time, a tongue plate attached to the seatbelt is engaged with a buckle fixed to the inner side in the vehicle width direction in the seat cushion. In this way, the three-point seatbelt restrains the torso and pelvis of the passenger seated in the rear seat.

The retractor generally includes a pretensioner mechanism and a load limiter mechanism. The pretensioner mechanism is configured to retract the seatbelt by reducing slack of the seatbelt at the time of collision to restrain the passenger. The load limiter mechanism is configured to loosen the seatbelt when a predetermined or larger load acts on the passenger at the time of collision to reduce an excessive load applied to the passenger.

As a passenger restraint device provided with a three-point seatbelt device, known has been a device including a belt guide disposed on the outer side in the vehicle width direction in an upper portion of the seat back of the rear seat and holding a seatbelt drawn from a retractor and inserted thereinto in the longitudinal direction of the vehicle body. The seatbelt inserted into the belt guide extends obliquely downward from the passenger's shoulder area on the outer side in the vehicle width direction, thus restraining the passenger.

Further, a device including a belt guide disposed on the outer side in the vehicle width direction in the upper portion of the seat back, and configured to move toward the inner side in the vehicle width direction at the time of collision has been known, as well. For example, Patent Document 1 discloses a device including a belt guide configured to move toward the inner side in the vehicle width direction along a slide rail fixed to a seat back by biasing the belt guide toward the inner side in the vehicle width direction, with a biasing spring at the time of collision.

CITATION LIST

Patent Documents

Patent Document 1: Japanese Unexamined Patent Publication No. 2016-88335

SUMMARY OF THE INVENTION

Technical Problem

In a vehicle including a three-point seatbelt capable of restraining a passenger seated in a rear seat, at the time of collision, such as an offset collision which is a frontal collision with one side, in a vehicle width direction, of a front portion of the vehicle, the passenger seated in the rear seat is moved toward the inner side in the vehicle width direction, which may cause the seatbelt to slip off the passenger's shoulder.

As described in Patent Document 1, it is possible to avoid slipping the seatbelt off the passenger's shoulder at the time of collision by moving the belt guide toward the inner side in the vehicle width direction along the slide rail fixed to the seat back by biasing the belt guide toward the inner side in the vehicle width direction with a biasing spring. However, a configuration of biasing the belt guide with the biasing spring and moving the belt guide along the slide rail is complex. Hence, moving the belt guide toward the inner side in the vehicle width direction at the time of collision using a relatively simple configuration is desirable.

To achieve the relatively simple configuration, the following is considered. An inner longitudinal surface portion of the belt guide disposed on the outer side, in the vehicle width direction, of an upper portion of the rear seat is configured to be inclined by a load directed toward the inner side in the vehicle width direction, applied from the seatbelt at the time of collision, to avoid slipping the seatbelt off the passenger's shoulder by moving the seatbelt toward the inner side in the vehicle width direction at the time of collision.

However, in the case in which the rear seat is configured as a folding seat, and a lock release switch for releasing the lock keeping the seat back in an upright state is disposed in an upper portion of the seat back of the rear seat, if the inner longitudinal surface portion of the belt guide is inclined by a load directed toward the inner side in the vehicle width direction, applied from the seatbelt at the time of collision, the lock release switch may be pressed by the belt guide, which may cause the seat back of the rear seat to be folded toward the front side of the vehicle body.

Therefore, an object of the technology disclosed herein is to provide a vehicular passenger restraint device which enables to improve a passenger protection performance by moving the seatbelt toward the inner side in the vehicle width direction and to avoid pressing the lock release switch by the belt guide at the time of collision in a vehicle in which the lock release switch for the rear seat is disposed on the inner side in the vehicle width direction relative to the belt guide.

Solution to the Problem

The technology disclosed herein is directed to a vehicular passenger restraint device and has the following characteristics.

The vehicular passenger restraint device including a seatbelt capable of restraining a passenger seated in a rear seat that includes a seat cushion and a seat back includes: a belt guide disposed on an outer side, in a vehicle width direction, of an upper portion of the seat back, the belt guide holding the seatbelt inserted thereinto in a longitudinal direction of a vehicle body. The belt guide includes a guide portion supporting the seatbelt from a lower side of the vehicle body and guiding the seatbelt, and an inner longitudinal surface portion provided on the inner side, in the vehicle width direction, of the guide portion and extending upward of the vehicle body. The inner longitudinal surface portion is configured to be tiltable toward the inner side in the vehicle width direction by a load directed toward the inner side in the vehicle width direction, applied from the seatbelt at the time of collision. A lock release switch for releasing lock keeping the seat back in an upright state is disposed on the inner side, in the vehicle width direction, of the upper portion of the seat back relative to the belt guide; and a regulation member regulating the inner longitudinal surface portion between the belt guide and the lock release switch not to be inclined toward the inner side in the vehicle width direction by a predetermined angle or more.

In the vehicular passenger restraint device, the inner longitudinal surface portion may have an inclined surface portion increasing in height toward the inner side in the vehicle width direction from the guide portion, and the regulation member may have an inclined surface portion that faces the inner longitudinal surface portion and increasing in height toward the inner side in the vehicle width direction.

In the vehicular passenger restraint device, the regulation member may be provided at a position overlapping with the belt guide in a vehicle width direction.

In the vehicular passenger restraint device, the belt guide may have an outer longitudinal surface portion provided on the outer side, in the vehicle width direction, of the guide portion and extending toward an upper side of the vehicle body, disposed on the guide portion on the outer side in the vehicle width direction, and the inner longitudinal surface portion which may be configured as a fragile portion more fragile against a load directed in the vehicle width direction applied from the seatbelt than the outer longitudinal surface portion.

Advantages of the Invention

The technology disclosed herein provides a vehicular passenger restraint device including a seatbelt capable of restraining a passenger seated in a rear seat. The vehicular passenger restraint device includes a belt guide disposed on the outer side, in the vehicle width direction, of an upper portion of a seat back. The belt guide supports the seatbelt from a lower side of a vehicle body and has an inner longitudinal surface portion provided on the inner side, in the vehicle width direction, of the guide portion. The inner longitudinal surface portion is configured to be tiltable toward the inner side in the vehicle width direction by a load directed toward the inner side in the vehicle width direction, applied from the seatbelt at the time of collision.

When a passenger seated in the rear seat is moved toward the inner side in the vehicle width direction at the time of collision, in particular an offset collision, the inner longitudinal surface portion of the belt guide is inclined toward the inner side in the vehicle width direction by the seatbelt, and moves the seatbelt toward the inner side in the vehicle width direction along with the passenger's movement. In this way, the passenger protection performance may be improved.

Further, the regulation member is provided between the belt guide and a lock release switch for the rear seat, which is disposed on the inner side in the vehicle width direction. Thus, the regulation member enables to avoid inclining the inner longitudinal surface portion by a predetermined angle or more and to avoid pressing the lock release switch by the belt guide.

Consequently, in a vehicle including the lock release switch for the rear seat, disposed on the inner side in the vehicle width direction relative to the belt guide, the seatbelt is moved toward the inner side in the vehicle width direction at the time of collision, thereby enabling to improve the passenger protection performance and to avoid pressing the lock release switch by the belt guide.

In the case in which the inner longitudinal surface portion has an inclined surface increasing in height toward the inner side in the vehicle width direction from the guide portion, and the regulation member has an inclined surface which faces the inner longitudinal surface portion and increasing in height toward the inner side in the vehicle width direction, the inclination of the inner longitudinal surface portion may be advantageously regulated by bringing the inclined surface of the inner longitudinal surface portion of the belt guide into contact with the inclined surface portion of the regulation member, thereby allowing the inclination of the inner longitudinal surface portion to be effectively regulated. Accordingly, the advantage can be effectively exhibited.

In the case in which the regulation member is provided at a position overlapping with the belt guide in the vehicle width direction, the regulation member can be disposed in a space below the belt guide in an upper portion of the seat back, and the belt guide and the regulation member may be configured compactly in the vehicle width direction.

In the case in which the inner longitudinal surface portion of the belt guide is configured as a fragile portion more fragile than the outer longitudinal surface portion, the inner longitudinal surface portion may be relatively easily inclined toward the inner side in the vehicle width direction by the seatbelt if the passenger is moved toward the inner side in the vehicle width direction at the time of collision, in particular, an offset collision. Accordingly, the advantage may be effectively exhibited.

DESCRIPTION OF EMBODIMENTS

Hereinafter, an embodiment of the disclosed technology will be described with reference to the accompanying drawings. The term "vehicle width direction" refers to a width direction of the vehicle and corresponds to a left-right direction of the vehicle body. The term "outer side in the vehicle width direction" refers to a side relatively close to the outside of the vehicle in the vehicle width direction, and the term "inner side in the vehicle width direction" refers to a side relatively close to the inside of the vehicle in the vehicle width direction.

Figure 1:
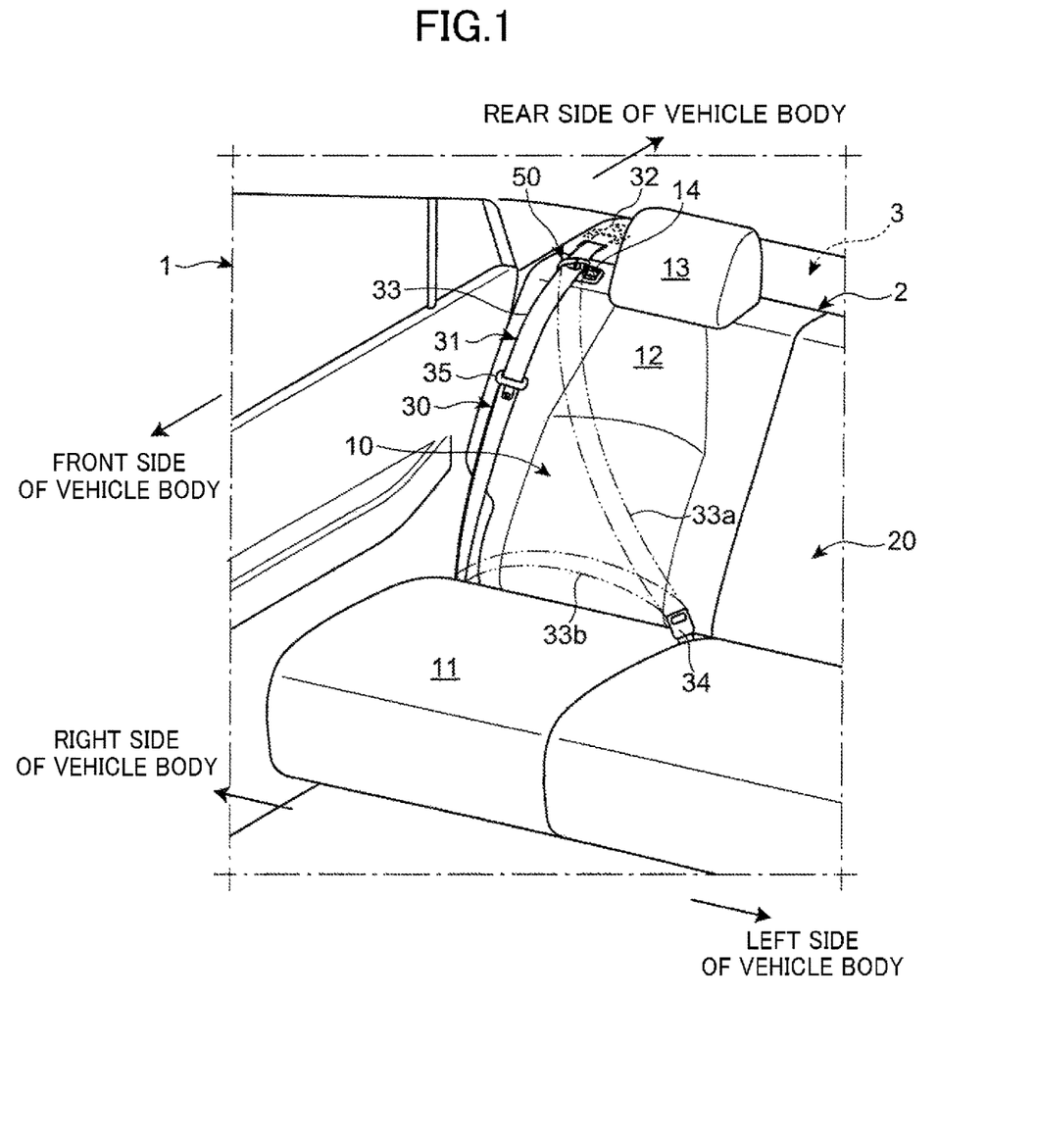
FIG. 1 is a perspective view illustrating a rear portion of a vehicle body including a vehicular passenger restraint device according to an embodiment.

FIG. 1 is a perspective view illustrating a rear portion of a vehicle body including a vehicular passenger restraint device to which the disclosed technology is applied. As shown in FIG. 1, in a vehicle 1 including a vehicular passenger restraint device, a rear seat 2 is disposed on the rear side of the vehicle body relative to a driver's seat and a front passenger's seat, which are front seats in a vehicle body. A cargo space 3 is formed behind the rear seat 2. The rear seat 2 is divided into a rear seat 10 on the right side of the vehicle body and a rear seat 20 on the left side of the vehicle body. The rear seat 10 on the right side of the vehicle body and the rear seat 20 on the left side of the vehicle body are formed substantially symmetrically in the vehicle width direction. The rear seat 10 on the right side of the vehicle body will now be described.

The rear seat 10 has a seat cushion 11, a seat back 12, and a headrest 13. The seat back 12 is configured to be turned in an upright state and a folded state. In the upright state, the seat back 12 extends upward of the vehicle body from a rear portion of the seat cushion 11. In the folded state, the seat back is folded frontward of the vehicle body above the seat cushion 11 1 by turning the seat back 12 frontward of the vehicle body from the upright state.

The rear seat 10 is further capable of locking the seat back 12 in the upright state by a locking mechanism (not shown). As will be described later, a lock release switch 14 for releasing the lock keeping the seat back 12 in the upright state by the locking mechanism is disposed on the outer side, in the vehicle width direction, of the upper portion of the seat back 12.

The rear seat 10 includes a passenger restraint device 30 for protecting a passenger seated in the rear seat 10. The passenger restraint device 30 includes a three-point seatbelt device 31 for protecting the passenger by restraining the torso and pelvis of the passenger seated in the rear seat 10.

The seatbelt device 31 includes a retractor 32, a seatbelt 33, and a belt anchor (not shown). The retractor is disposed on the outer side in the vehicle width direction on the rear side of a vehicle body relative to the rear seat 10. The seatbelt is capable of restraining the passenger seated in the rear seat 10 by being drawn frontward of the vehicle body from the retractor 32. The belt anchor is disposed on the outer side, in the vehicle width direction, of the seat cushion 11 and is coupled to a tip of the seatbelt 33.

The retractor 32 includes a pretensioner mechanism and a load limiter mechanism. The pretensioner mechanism is configured to enable the seatbelt 33 to be drawn frontward of the vehicle body, and retracts the seatbelt 33 to reduce slack of the seatbelt 33 and restrain the passenger at the time of collision. The load limiter mechanism loosens the seatbelt 33 to avoid a predetermined or larger load from being applied to the seatbelt 33 at the time of collision.

The seatbelt 33 is formed into a stripe shape by weaving synthetic fibers such as nylon. The seatbelt 33 includes a tongue plate 35 which is attached to a middle portion of the seatbelt 33 drawn from the retractor 32, and detachably engages with a buckle 34 fixed to the inner side in the vehicle width direction in the seat cushion 11.

The seatbelt device 31 engages the tongue plate 35, attached to the seatbelt 33 drawn frontward of the vehicle body from the retractor 32, with the buckle 34 in front of the passenger seated in the rear seat 10 in the vehicle body. In this way, the seatbelt device 31 protects the passenger by restraining the torso and pelvis of the passenger seated in the rear seat 10.

The seatbelt 33 includes a shoulder belt 33*a* and a lap belt 33*b*. The shoulder belt 33*a* is drawn obliquely downward from the passenger's shoulder positioned on the outer side in the vehicle width direction to the passenger's hip positioned on the inner side in the vehicle width direction as indicated by a dash-dot-dot line in FIG. 1 when the tongue plate 35 is engaged with the buckle 34, to restrain the passenger's torso. Meanwhile, the lap belt 33*b* is drawn from the passenger's hip positioned on the inner side in the vehicle width direction to the passenger's hip positioned on the outer side in the vehicle width direction, to restrain the passenger's pelvis.

The passenger restraint device 30 further includes a belt guide 50 disposed on the outer side, in the vehicle width direction, of the upper portion of the seat back 12 of the rear seat 10. The belt guide 50 is configured to hold the seatbelt 33 drawn from the retractor 32 and inserted thereinto in the longitudinal direction of the vehicle body, at a predetermined position on the outer side, in the vehicle width direction, of the upper portion of the seat back 12.

Figure 2:
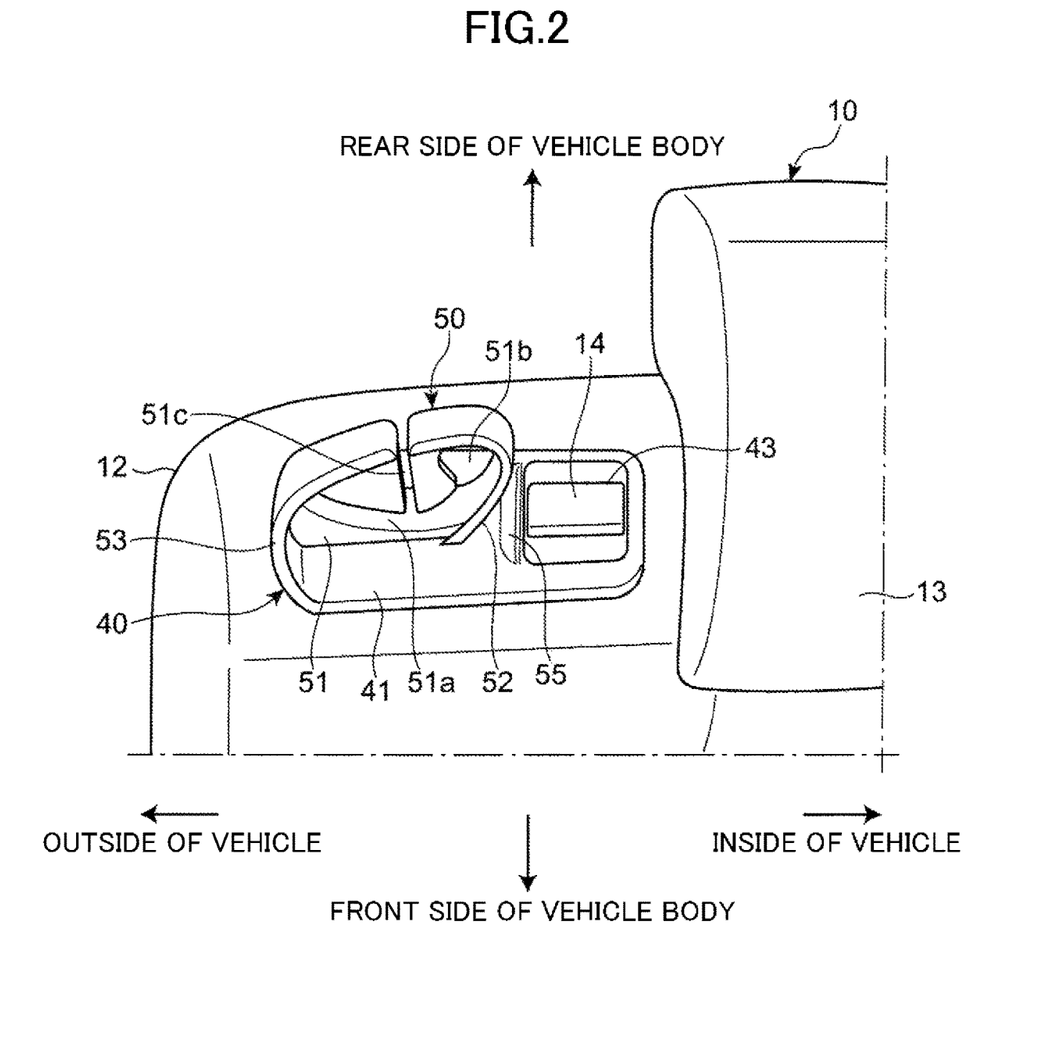
FIG. 2 is a perspective view illustrating an upper portion of a rear seat.
Figure 3:
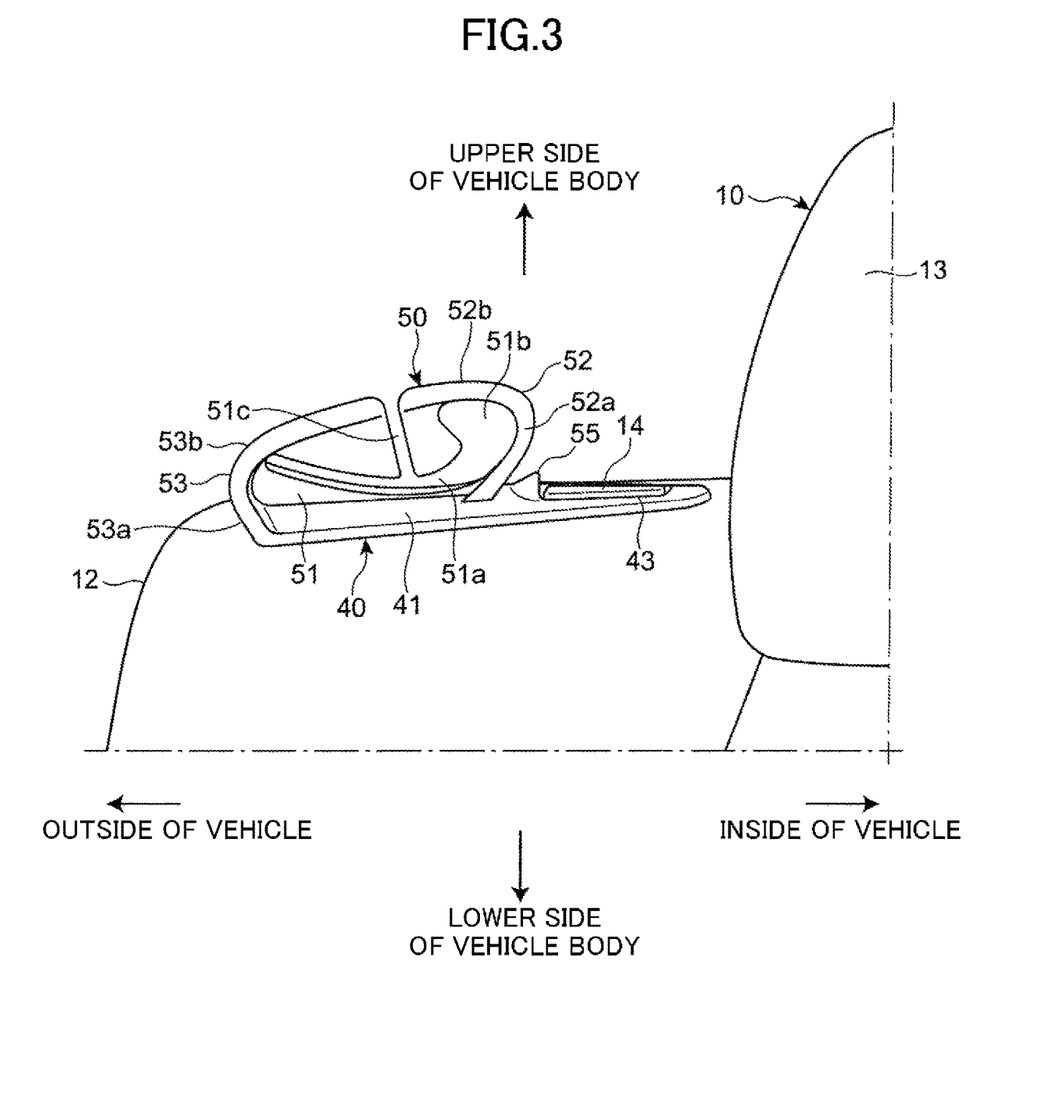
FIG. 3 is a front view illustrating the upper portion of the rear seat.
Figure 4:
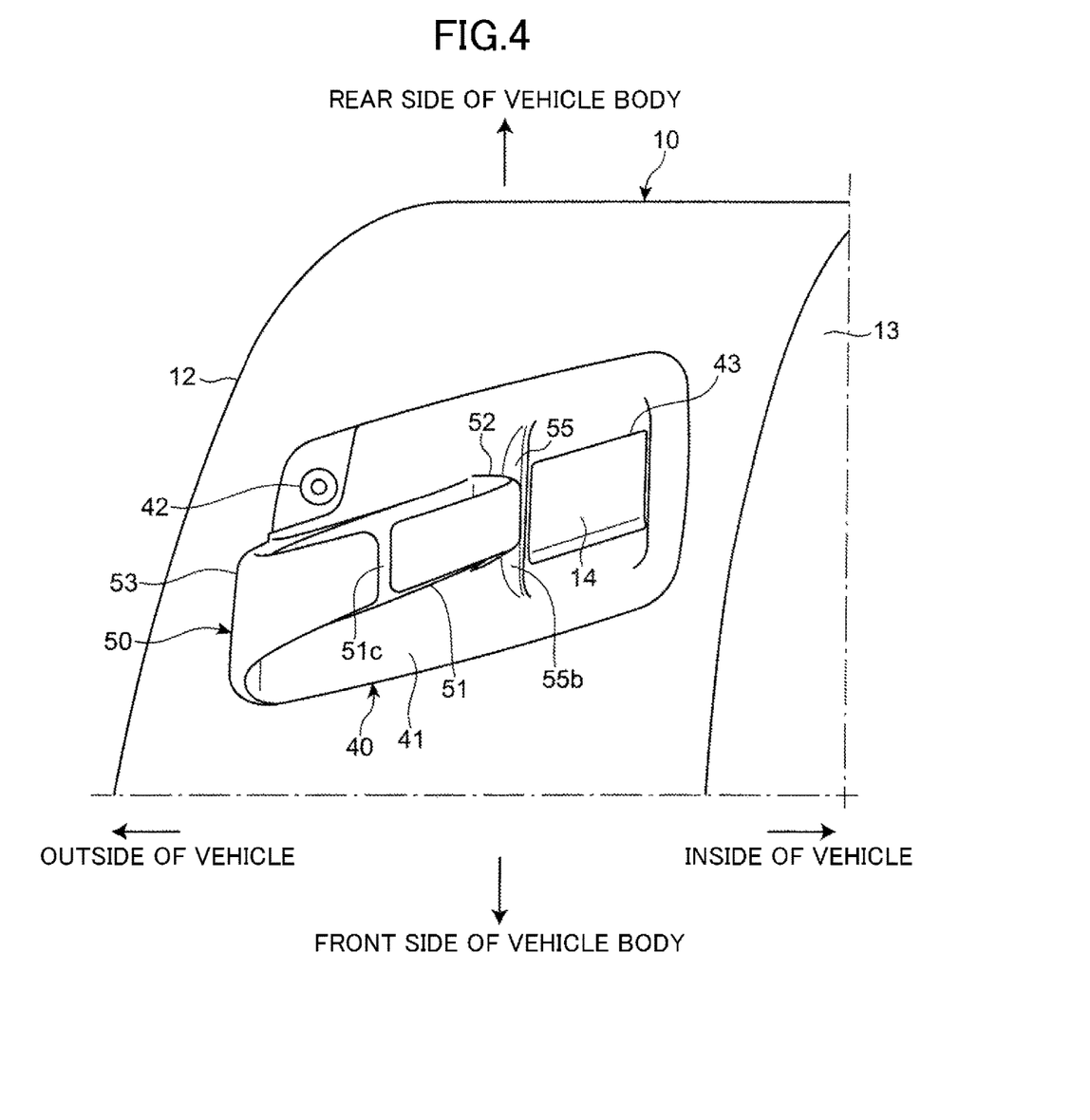
FIG. 4 is a plan view illustrating the upper portion of the rear seat.

FIG. 2 is a perspective view illustrating the upper portion of the rear seat. FIG. 3 is a front view illustrating the upper portion of the rear seat. FIG. 4 is a plan view illustrating the upper portion of the rear seat. FIGS. 2 to 4 illustrate the outer side, in the vehicle width direction, of the upper portion of the rear seat 10 shown in FIG. 1.

As shown in FIGS. 2 to 4, on an outer side of the headrest 13 in the vehicle width direction, the belt guide 50 is integrally formed with a guide member 40 disposed on the outer side, in the vehicle width direction, of the upper portion of the seat back 12 of the rear seat 10.

The guide member 40 is integrally formed using a resin material, and includes a base portion 41 extending in a substantially horizontal direction. As shown in FIG. 4, the base portion 41 is formed in a substantially parallelogram in a planar view, and is fixed to a seat back frame (not shown) by a fixing tool 42. The seat back frame is formed of a metal pipe member disposed inside the seat back 12.

The base portion 41 of the guide member 40 is provided with a belt guide 50 and a switch housing hole 43. The belt guide 50 holding the seatbelt 33 inserted thereinto in the longitudinal direction of the vehicle body is provided on the outer side in the vehicle width direction in the base portion 41 such that the belt guide 50 protrudes upward of the vehicle body. The switch housing hole 43 houses a lock release switch 14 and is provided on the headrest 13 side, which is the inner side of the base portion 41 in the vehicle width direction.

The switch housing hole 43 of the base portion 41 is an opening in a substantially parallelogram in a planar view. The lock release switch 14 formed in a substantially parallelogram in a planar view is fitted to and held by the switch housing hole 43 to be movable in a vertical direction of the vehicle body such that an upper face of the lock release switch 14 is substantially flush with an upper face of the base portion 41 with the lock release switch 14 biased upward of the vehicle body. Pressing the lock release switch 14 downward of the vehicle body releases the lock keeping the seat back 12 in the upright state and allowing the seat back 12 to turn forward of the vehicle body to be in the folded state.

The belt guide 50 includes a guide portion 51, an inner longitudinal surface portion 52, and an outer longitudinal surface portion 53. The guide portion 51 supports the seatbelt 33 from a lower side of the vehicle and guides the seatbelt. The inner longitudinal surface portion 52 is provided on the inner side, in the vehicle width direction, of the guide portion 51 and extends upward of the vehicle body. The outer longitudinal surface portion 53 is provided on the outer side, in the vehicle width direction, of the guide portion 51 and extends upward of the vehicle body.

The guide portion 51 is provided to have a predetermined width in the longitudinal direction of the vehicle body on a middle side of the base portion 41 of the guide member 40 in the longitudinal direction of the vehicle body and extends upward of the vehicle body. The guide portion 51 includes an insertion hole 51*a* into which the seatbelt 33 is inserted in the longitudinal direction of the vehicle body.

The insertion hole 51*a* has a width wider in the vehicle width direction than that of the seatbelt 33. The insertion hole 51a includes a predetermined clearance in the vertical direction of the vehicle body, and is formed in a slit shape. The inner side of the insertion hole 51a in the vehicle width direction is closed by the inner longitudinal surface portion 52, and the outer side of the insertion hole in the vehicle width direction portion 51a is closed by the outer longitudinal surface portion 53.

The insertion hole 51a includes a belt housing portion 51b formed from an outer side to an inner side in the vehicle width direction to be curved downward of the vehicle body in a convex shape and extending upward of the vehicle body. The belt housing portion 51b is formed in a substantially elliptical shape in a front view, in a size which allows the seatbelt 33 to be rolled and housed therein when is moved toward the inner side in the vehicle width direction along the insertion hole 51a at the time of collision.

The guide portion 51 further includes a belt insertion slot 51c for inserting the seatbelt 33 into the insertion hole 51a from the upper side of the vehicle body, provided on the middle side in the vehicle width direction. The belt insertion slot 51c has a predetermined clearance in the vehicle width direction, and is formed in a slit shape. The belt insertion slot 51c opens on the upper side of the vehicle body, communicates with the insertion hole 51a on the lower side of the vehicle body, and extends in the vertical direction of the vehicle body.

When the seatbelt 33 is inserted into the belt guide 50, the seatbelt 33 is inserted into the belt insertion slot 51c from the upper side of the vehicle body and moved downward of the vehicle body. The seatbelt 33 is further moved toward the outer side in the vehicle width direction in the insertion hole 51a, then the seatbelt 33 is moved toward the right side of the insertion hole 51 a in the vehicle width direction to dispose the seatbelt 33 on the middle side of the insertion hole 51a in the vehicle width direction. In this way, the seatbelt 33 is inserted into the belt guide 50 in the longitudinal direction of the vehicle body.

The inner longitudinal surface portion 52 has a predetermined thickness, extends upward of the vehicle body from the inner side of the guide portion 51 in the vehicle width direction. The inner longitudinal surface portion 52 is curved toward the outer side in the vehicle width direction in a convex shape. The inner longitudinal surface portion 52 includes a lower portion 52a and an upper portion 52b. The lower portion 52a extends toward the inner side in the vehicle width direction as extending from the inner side of the guide portion 51 in the vehicle width direction toward the upper side of the vehicle body. The upper portion 52b extends toward the outer side in the vehicle width direction as extending from the lower portion 52a of the inner longitudinal surface portion 52 toward the upper side of the vehicle body.

The outer longitudinal surface portion 53 has a predetermined thickness, extends upward of the vehicle body from the outer side of the guide portion 51 in the vehicle width direction, and is curved toward the outer side in the vehicle width direction in a convex shape. The outer longitudinal surface portion 53 includes a lower portion 53a and an upper portion 53b. The lower portion 53a extends toward the outer side in the vehicle width direction as extending from the outer side of the guide portion 51 in the vehicle width direction toward upward of the vehicle body. The upper portion 53b extends toward the inner side in the vehicle width direction as extending from the lower portion 53a of the outer longitudinal surface portion 53 toward the upper side of the vehicle body.

The inner longitudinal surface portion 52 and the outer longitudinal surface portion 53 are formed to have substantially equal thicknesses. The inner longitudinal surface portion 52 and the outer longitudinal surface portion 53 each have an end portion provided so as to be spaced apart from each other in correspondence with the belt insertion slot 51c of the guide portion 51.

The belt guide 50 is configured to be tiltable toward the inner side in the vehicle width direction by a load directed toward the inner side in the vehicle width direction, applied from the seatbelt 33 to the inner longitudinal surface portion 52. The load is applied to the seatbelt 33 when the passenger seated in the rear seat 10 is moved toward the inner side in the vehicle width direction at the time of collision such as offset collision which is a frontal collision with the left side of the front portion of the vehicle body.

In the present embodiment, the inner longitudinal surface portion 52 is formed to have a smaller width than the outer longitudinal surface portion 53 in the longitudinal direction of the vehicle body. Thus, the inner longitudinal surface portion 52 is configured as a fragile portion that is more fragile against the load directed in the vehicle longitudinal direction, applied from the seat belt 33 than the outer longitudinal surface portion 53. The inner longitudinal surface portion 52 is inclined toward the inner side in the vehicle width direction by the load directed toward the inner side in the vehicle width direction, applied from the seatbelt 33 at the time of collision.

The inner longitudinal surface portion 52 and the outer longitudinal surface portion 53 normally are not inclined toward the inner side and the outer side in the vehicle width direction, respectively, by the load directed toward the inner side and the outer side in the vehicle width direction, applied from the seatbelt 33. The inner longitudinal face portion 52 is inclined toward the inner side in the vehicle width direction when the load directed toward the inner side in the vehicle width direction, applied from the seatbelt 33 at the time of collision is a predetermined load or higher.

Figure 5A:
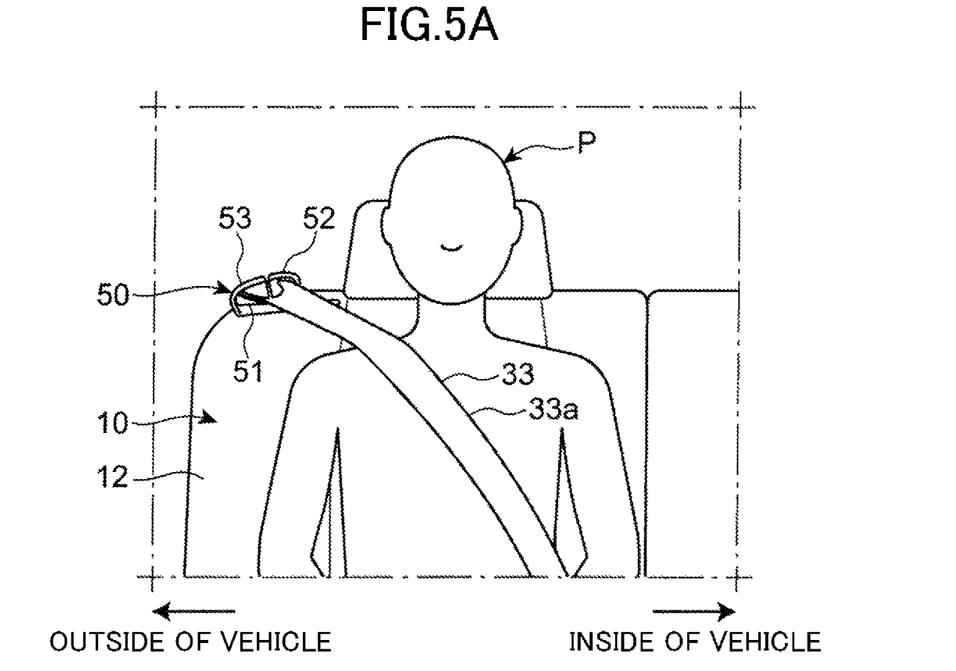
FIGS. 5A and 5B are explanatory diagrams illustrating movement of a seatbelt at the time of collision.
Figure 5B:
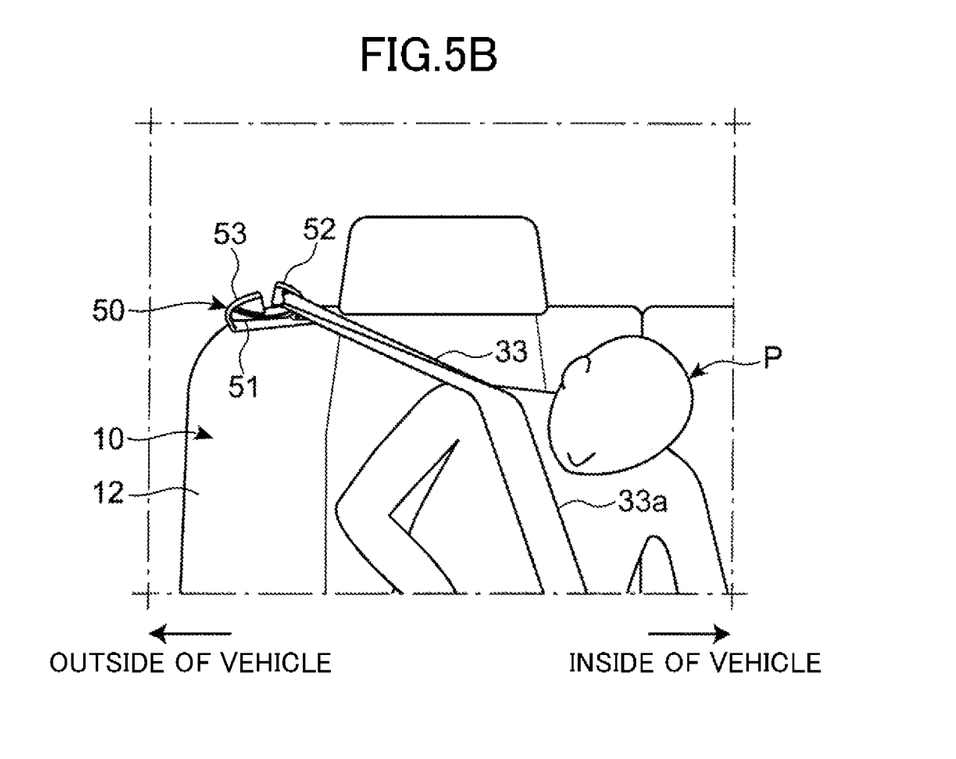

FIGS. 5A and 5B are explanatory diagrams illustrating the movement of the seatbelt at the time of collision. As shown in FIG. 5A, the passenger P seated on the rear seat 10 which is disposed in the vehicle 1 is restrained by the seatbelt 33 inserted into the belt guide 50, and the passenger's torso is restrained by the shoulder belt 33a. If in this state, an offset collision which is a frontal collision with the left side of the front portion of the vehicle body occurs, the passenger P is moved toward the front side of the vehicle body and moved toward the inner side in the vehicle width direction.

As shown in FIG. 5B, when the load directed toward the inner side in the vehicle width direction acts on the seatbelt 33 with the movement of the passenger P, the seatbelt 33 is moved toward the inner side in the vehicle width direction and housed in the belt housing portion 51b. At the same time, the load directed toward the inner side in the vehicle width direction is applied from the seatbelt 33 to the inner longitudinal surface portion 52 of the belt guide 50. If the load directed toward the inner side in the vehicle width direction, applied from the seatbelt 33, becomes the predetermined load or higher, the inner longitudinal surface portion 52 is inclined toward the inner side in the vehicle width direction, and the seatbelt 33 is moved toward the inner side in the vehicle width direction.

Figure 6:
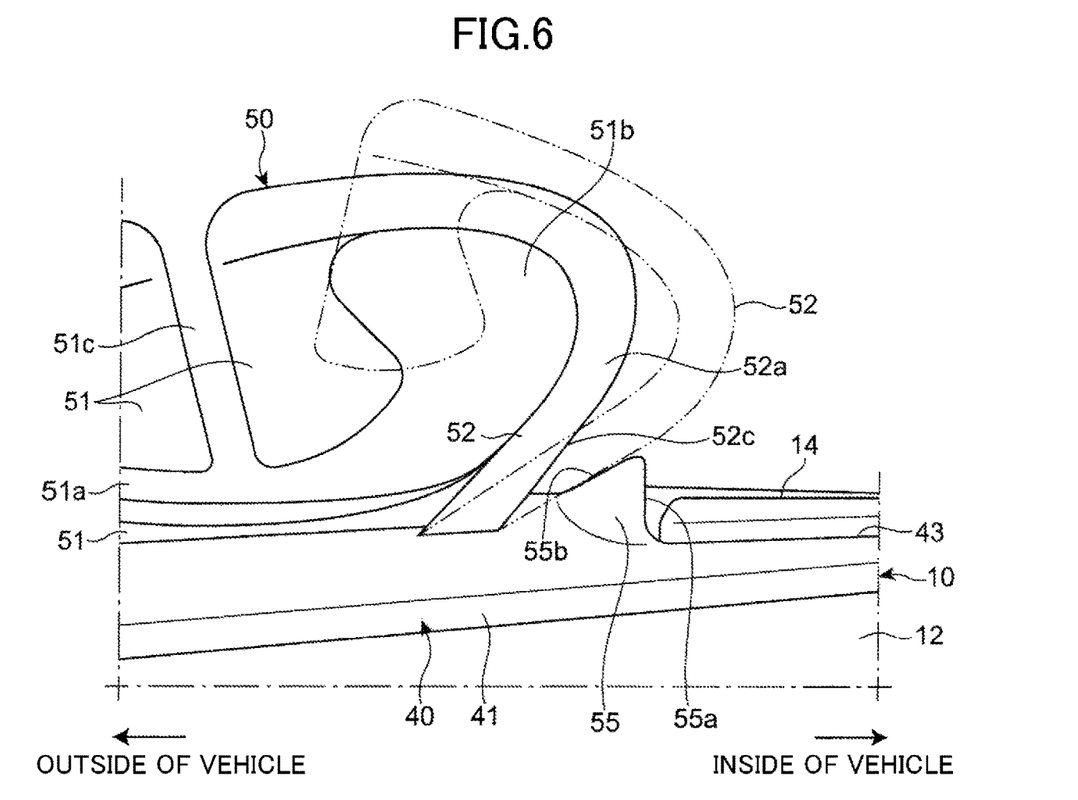
FIG. 6 is an enlarged view illustrating an enlarged main part of the upper portion of the rear seat.

FIG. 6 is an enlarged view illustrating an enlarged main part of the upper portion of the rear seat. As shown in FIG. 6, the lock release switch 14 is disposed on the inner side in the vehicle width direction relative to the belt guide 50 to be flush with the belt guide 50. The lock release switch 14 is disposed in a position where it is pressed by the inner longitudinal surface portion 52 when the inner longitudinal surface portion 52 of the belt guide 50 is inclined toward the inner side in the vehicle width direction.

In the present embodiment, a regulation member 55 is provided between the belt guide 50 and the lock release switch 14. The regulation member 55 regulates the inclination of the inner longitudinal surface portion 52 such that the inner longitudinal surface portion 52 is not inclined toward the inner side in the vehicle width direction by a predetermined angle or more in order to avoid pressing the lock release switch 14 by the inner longitudinal surface portion 52.

The regulation member 55 is integrally formed with the guide member 40, and is provided so as to protrude upward of the vehicle body from the base portion 41 of the guide member 40, to have a substantially triangular cross section. The regulation member 55 includes a vertical surface portion 55a and an inclined surface portion 55b. The vertical surface portion 55a is positioned on the inner side, in the vehicle width direction, of the regulation member 55 and extends in a substantially vertical direction. The inclined surface portion 55b is positioned on the outer side in the vehicle width direction and is inclined upward of the vehicle body at a predetermined inclination angle toward the inner side in the vertical surface portion. In other words, the regulation member 55 includes the inclined surface portion 55b facing the inner longitudinal surface portion 52 and increasing in height toward the inner side in the vehicle width direction.

The inner longitudinal surface portion 52 of the belt guide 50 includes an inclined surface portion 52c on the outer side of the lower portion 52a in the vehicle width direction. The inclined surface portion 52c is inclined upward of the vehicle body at a predetermined inclination angle from the guide portion 51 toward the inner side in the vehicle width direction. In other words, the inner longitudinal surface portion 52 includes the inclined surface portion 52c increasing in height toward the inner side in the vehicle width direction from the guide portion 51. As indicated by the dash-dot-dot line in FIG. 6, the inclination angle for the inner longitudinal surface portion 55b of the regulation member 55 is set to be identical to that for the inclined surface portion 52c of the inner longitudinal surface portion 52 when the inner longitudinal surface portion 52 is inclined toward the inner side in the vehicle width direction.

The regulation member 55 is disposed on the lower side of the vehicle body relative to the inclined surface portion 52c of the inner longitudinal surface portion 52 of the belt guide 50, at a position which overlaps with the belt guide 50 in the vehicle width direction. As shown in FIG. 4, the regulation member 55 is provided so as to extend frontward and rearward in the longitudinal direction of the vehicle body, beyond the inner longitudinal surface portion 52 of the belt guide 50 and the lock release switch 14.

In the vehicle 1, the regulation member 55 provided in this manner enables to avoid inclining the inner longitudinal surface portion 52 of the belt guide 50 by the predetermined angle or more and to avoid pressing of the lock release switch 14 by the belt guide 50.

In the present embodiment, the regulation member 55 is integrally formed with the guide member 40, but the regulation member 55 may be formed separately from and then coupled to the guide member 40. Further, the regulation member 55 is formed to have a substantially right-angled triangle cross section, but may be formed to have a cross section in any other shape such as a substantially trapezoidal cross section.

In the present embodiment, the inner longitudinal surface portion 52 is configured as the fragile portion that is more fragile than the outer longitudinal surface portion 53 by being formed to have a width in the longitudinal direction of the vehicle body, smaller than the outer longitudinal surface portion 53. However, the inner longitudinal surface portion 52 may be configured as a fragile portion that is more fragile than the outer longitudinal surface portion 53 by being formed of a material that is more easily elastically deformed compared to the outer longitudinal surface portion 53.

As described above, the vehicular passenger restraint device 30 according to the present embodiment includes the belt guide 50 which is disposed on the outer side, in the vehicle width direction, of the upper portion of the seat back 12 of the rear seat 10. The belt guide 50 includes an inner longitudinal surface portion 52 that is provided on the inner side in the vehicle width direction relative to the guide portion 51 which supports the seatbelt 33 from the lower side of the vehicle body. The belt guide 50 is configured such that the inner longitudinal surface portion 52 is tiltable toward the inner side in the vehicle width direction by the load directed toward the inner side in the vehicle width direction, applied from the seatbelt 33 at the time of collision.

With this configuration, with the movement of the passenger P seated in the rear seat 10 toward the inner side in the vehicle width direction at the time of collision, the inner longitudinal surface portion 52 of the belt guide 50 is tilted toward the inner side in the vehicle width direction by the seatbelt 33, thereby moving the seatbelt 33 toward the inner side in the vehicle width direction. Accordingly, the passenger protection performance can be improved.

Further, the regulation member 55 is provided between the belt guide 50 and the lock release switch 14 for the rear seat, which is disposed on the inner side in the vehicle width direction. In this way, the regulation member 55 enables to avoid inclining the inner longitudinal surface portion 52 by a predetermined angle or more, and to avoid pressing the lock release switch 14 by the belt guide 50.

Therefore, in the vehicle in which the lock release switch 14 for the rear seat is disposed on the inner side in the vehicle width direction relative to the belt guide 50, the seatbelt 33 may be moved toward the inner side in the vehicle width direction at the time of collision, thereby enabling to improve the passenger protection performance and to avoid pressing the lock release switch 14 by the belt guide 50.

Further, the inner longitudinal surface portion 52 includes the inclined surface portion 52c inclined upward of the vehicle body toward the inner side in the vehicle width direction from the guide portion 51. The regulation member 55 includes an inclined surface portion 55b facing the inner longitudinal surface portion 52 and inclined upward of the vehicle body toward the inner side in the vehicle width direction. It is thereby possible to effectively regulate inclination of the inner longitudinal surface portion 52 by bringing the inclined surface portion 52c of the inner longitudinal surface portion 52 of the belt guide 50 into contact with the inclined surface portion 55b of the regulation member 55.

Further, the regulation member 55 is provided at a position overlapping with the belt guide 50 in the vehicle width direction. Accordingly, the regulation member 55 may be disposed in a space below the belt guide 50 in the upper portion of the seat back 12. Thus, the belt guide 50 and the regulation member 55 may be configured compactly in the vehicle width direction.

Further, in the belt guide 50, the inner longitudinal surface portion 52 is configured as a fragile portion that is more fragile than the outer longitudinal surface portion 53. With this configuration, the inner longitudinal surface portion 52 can be relatively easily inclined toward the inner side in the vehicle width direction by the seatbelt 33 with the movement of the passenger toward the inner side in the vehicle width direction at the time of collision, in particular, an offset collision.

The disclosed technology is not limited to the exemplary embodiments, and various modifications and changes in design can be made without departing from the gist of the disclosed technology.

INDUSTRIAL APPLICABILITY

As described above, in the vehicle in which the lock release switch for the rear seat is disposed on the inner side, in a vehicle width direction, relative to the belt guide, the disclosed technology enables to improve the passenger protection performance by moving a seatbelt toward the inner side in the vehicle width direction and to avoid pressing of a lock release switch by a belt guide at the time of collision. Thus, the technology may be advantageously used in an industry of manufacturing this kind of vehicles.

DESCRIPTION OF REFERENCE CHARACTERS

1 Vehicle
2, 10, 20 Rear Seat
11 Seat Cushion
12 Seat Back
14 Lock Release Switch
30 Passenger Restraint Device
33 Seatbelt
50 Belt Guide
51 Guide Portion
52 Inner Longitudinal Surface Portion
53 Outer Longitudinal Surface Portion
55 Regulation Member

The invention claimed is:

1. A vehicular passenger restraint device including a seatbelt capable of restraining a passenger seated in a rear seat that includes a seat cushion and a seat back, the vehicular passenger restraint device comprising:
   a belt guide disposed on an outer side, in a vehicle width direction, of an upper portion of the seat back, the belt guide holding the seatbelt inserted thereinto in a longitudinal direction of a vehicle body,
   the belt guide including a guide portion supporting the seatbelt from a lower side of the vehicle body and guiding the seatbelt, and an inner longitudinal surface portion provided on an inner side, in the vehicle width direction, of the guide portion and extending upward of the vehicle body, the inner longitudinal surface portion being configured to be tiltable toward the inner side in the vehicle width direction by a load directed toward the inner side in the vehicle width direction, applied from the seatbelt at the time of collision, wherein
   a lock release switch for releasing a lock keeping the seat back in an upright state is disposed on the inner side, in the vehicle width direction, of the upper portion of the seat back relative to the belt guide; and
   a regulation member regulating the inner longitudinal surface portion between the belt guide and the lock release switch not to be inclined toward the inner side in the vehicle width direction by a predetermined angle or more.

2. The vehicular passenger restraint device of claim 1, wherein the inner longitudinal surface portion includes an inclined surface portion increasing in height toward the inner side in the vehicle width direction from the guide portion, and
   the regulation member has an inclined surface portion that faces the inner longitudinal surface portion and increasing in height toward the inner side in the vehicle width direction.

3. The vehicular passenger restraint device of claim 2, wherein the regulation member is provided at a position overlapping with the belt guide in the vehicle width direction.

4. The vehicular passenger restraint device of claim 3, wherein the belt guide further includes an outer longitudinal surface portion provided on the outer side, in the vehicle width direction, of the guide portion and extending upward of the vehicle body, and the inner longitudinal surface portion is configured as a fragile portion more fragile against a load directed in the vehicle width direction, applied from the seatbelt than the outer longitudinal surface portion.

5. The vehicular passenger restraint device of claim 2, wherein the belt guide further includes an outer longitudinal surface portion provided on the outer side, in the vehicle width direction, of the guide portion and extending upward of the vehicle body, and the inner longitudinal surface portion is configured as a fragile portion more fragile against a load directed in the vehicle width direction, applied from the seatbelt than the outer longitudinal surface portion.

6. The vehicular passenger restraint device of claim 1, wherein the belt guide further includes an outer longitudinal surface portion provided on the outer side, in the vehicle width direction, of the guide portion and extending upward of the vehicle body, and the inner longitudinal surface portion is configured as a fragile portion more fragile against a load directed in the vehicle width direction, applied from the seatbelt than the outer longitudinal surface portion.

* * * * *